(12) United States Patent
Ye et al.

(10) Patent No.: US 10,337,641 B2
(45) Date of Patent: Jul. 2, 2019

(54) SWITCH VALVE UNIT, FLUID SWITCH AND KIT OF FLUID SWITCHES

(71) Applicants: Xiamen Lota International Co., LTd., Xiamen, Fujian (CN); La Vida Industrial Co., Ltd., Xiamen, Fujian (CN)

(72) Inventors: Liming Ye, Fujian (CN); Jianping Zhou, Fujian (CN); Shuanglin Bai, Fujian (CN)

(73) Assignees: Xiamen Lota International Co., LTd., Xiamen (CN); La Vida Industrial Co., Ltd., Xiamen (CN)

( * ) Notice: Subject to any disclaimer, the term of this patent is extended or adjusted under 35 U.S.C. 154(b) by 0 days.

(21) Appl. No.: 15/649,935

(22) Filed: Jul. 14, 2017

(65) Prior Publication Data
US 2018/0031141 A1    Feb. 1, 2018

(30) Foreign Application Priority Data
Jul. 27, 2016    (CN) .......................... 2016 1 0597641

(51) Int. Cl.
*F16K 27/02*    (2006.01)
*F16K 47/02*    (2006.01)
(Continued)

(52) U.S. Cl.
CPC ...... *F16K 31/3855* (2013.01); *F16K 27/0236* (2013.01); *F16K 31/145* (2013.01); *F16K 31/52491* (2013.01); *F16K 47/023* (2013.01)

(58) Field of Classification Search
CPC ........... F16K 31/3855; F16K 31/52491; F16K 31/145; F16K 27/0236; F16K 47/023; E03C 1/04
See application file for complete search history.

(56) References Cited

U.S. PATENT DOCUMENTS 3,652,053 A    3/1972 Poitras et al.
4,505,296 A    3/1985 Field et al.
(Continued)

FOREIGN PATENT DOCUMENTS

CN    2053701 U    2/1990
CN    2431452 Y    5/2010
(Continued)

OTHER PUBLICATIONS

European Search Report dated Jul. 12, 2017 received in 17170568.4, pp. 9.

*Primary Examiner* — Eric Keasel
(74) *Attorney, Agent, or Firm* — Zhong Law, LLC

(57) ABSTRACT

The present disclosure relates to a switch valve unit, a fluid switch, and a fluid switch assembly. The switch valve unit comprises a valve seat which defines a valve cavity having an open bottom end port; an at least partially axially deformable diaphragm member which is mounted in the valve cavity to divide the valve cavity into an upper cavity portion and a lower cavity portion, and provided with a first hole and a second hole spaced from each other and providing fluid communication between the upper cavity portion and the lower cavity portion; a button axially movably mounted on the valve seat; and a valve rod assembly connected to the button so as to follow the movement of the button, extending through the valve seat and into the upper cavity portion, and having a first position to seal the first hole and a second position to depart from the second first hole.

18 Claims, 14 Drawing Sheets

(51) Int. Cl.
    *F16K 31/145*     (2006.01)
    *F16K 31/385*     (2006.01)
    *F16K 31/524*     (2006.01)

(56) References Cited

U.S. PATENT DOCUMENTS

| | | | |
|---|---|---|---|
| 4,787,411 A | | 11/1988 | Moldenhauer |
| 7,296,593 B2 * | | 11/2007 | Matsui ................ E03C 1/04 |
| | | | 251/38 |

FOREIGN PATENT DOCUMENTS

| | | |
|---|---|---|
| CN | 202612822 U | 12/2012 |
| CN | 203230877 U | 10/2013 |
| CN | 203656296 U | 6/2014 |
| CN | 203948677 U | 11/2014 |
| CN | 205244470 U | 5/2016 |
| CN | 206072416 U | 4/2017 |
| DE | 102012221043 A1 | 5/2014 |
| DE | 102012221047 A1 | 5/2015 |
| GB | 2388889 A | 11/2003 |
| JP | 2002071050 A | 3/2002 |
| JP | 3743006 B2 | 2/2006 |

* cited by examiner

SWITCH VALVE UNIT, FLUID SWITCH AND KIT OF FLUID SWITCHES

CROSS-REFERENCE TO RELATED APPLICATIONS

This application claims foreign priority to China Patent Application No. CN 201610597641.9 filed Jul. 27, 2016, the content of which is incorporated herein by reference in its entirety.

TECHNICAL FIELD

The present disclosure relates to the technical field of fluid switch, particularly to a switch valve unit, a fluid switch, and a kit of fluid switches.

BACKGROUND

Generally, a fluid switch such as a faucet is provided with a switch valve to control flow, temperature and the like. A switch valve per se has a fixed flow path, for instance, defining the path along which the fluid flows in and out axially, or radially.

The Chinese utility model patent CN 203948677U, published on Nov. 19, 2014, disclosed a button type water separator which comprises a hand wheel in which a first spring seat is nested. A first spring is in turn nested over the first spring seat. A button is arranged within the first spring seat, and is connected to a switching rod, which is in turn sequentially connected to a brake core, a brake core seat, a seal assembly and a second spring seat, which are located within a base. A third spring is arranged within the second spring seat which at the lower end is fixedly connected with a push plug. The lower end of the sealing assembly contacts against a floating device, through which a puncturing part passes. The lower end of the base is connected to a water outlet seat for water inflow and outflow.

The German patent application DE 102012221043 A1 published on May 22, 2014, disclosed a sanitary valve which comprises a diaphragm valve with a control hole and a control plunger which interacts with the control hole. The control plunger and the control opening form a pilot valve. If the pilot valve is opened, the diaphragm valve opens in a pressure-controlled manner. The sanitary valve further comprises a stop for limiting the opening of the diaphragm valve. The stop can be adjusted by the same actuating element, by way of which the pilot valve and the diaphragm valve can be opened and closed.

The Chinese utility model patent CN 202612822 U published on Dec. 19, 2012, disclosed a button valve, which comprises a valve body arranged on a waterstop piece that is arranged on a water inflow pipe. An on-off key is nested on the top of the valve body. A button is moveably connected to the top of the on-off key. A spring is arranged between the button and the on-off key. A magnet is arranged on the top of the button. A valve core rod is moveably arranged within the valve body, and at the bottom thereof is fixedly connected to the waterstop which at the bottom is provided with the water inflow pipe.

The Chinese utility model patent CN 203656296 U published on Jun. 18, 2014, disclosed a press-open/close flow adjustment valve comprising a body which comprises a water inlet end and at least one water outlet end as well as a water inlet cavity and at least one water outlet cavity correspondingly arranged within the body. Arranged between the water inlet cavity and the water outlet cavity is a cavity separation wall, over which a diaphragm is arranged to cover the water inlet cavity and the water outlet cavity or separate them from each other. Formed between the diaphragm and the top of the cavity separating wall is a water outflow gap. The diaphragm is provided with a central through hole which enables the water outlet cavity to be in communication with the upper surface of the diaphragm. The diaphragm is further provided with side holes which enable the upper surface of the diaphragm to be in communication with the water inlet cavity. Further arranged within the body is a sealing means which is axially moveable and comprises a first setting point and a second setting point. At different setting points, the sealing device seals or disengages from the top opening of the central through hole of the diaphragm. Further arranged on the body is a diaphragm control means which controls the upward and downward movement of the diaphragm and thus the size of the cross section of the water outlet gap.

In these disclosed solutions, a fixed flow path is formed in a valve, which limits the types of platform the valve is adapted to fit with. Consequently, various valves with different flow paths are required to be made for different platforms, which results in low adaptability and high cost. In addition, in some technologies, the button and decorative parts are connected to each other in a complicated or relatively movable manner, which is disadvantageous to mounting and observation of operation status of the valve.

Therefore, there is need in the art to improve the performance of fluid switch valve.

SUMMARY OF THE INVENTION

The present disclosure aims to provide a switch valve unit, a fluid switch, and a fluid switch assembly to solve at least part of the aforesaid problems.

In one aspect, a switch valve unit is provided. The switch valve unit comprises a valve seat which defines a valve cavity having an open bottom end port; an at least partially axially deformable diaphragm member which is mounted in the valve cavity to divide the valve cavity into an upper cavity portion and a lower cavity portion, and provided with a first hole and a second hole spaced from each other and providing fluid communication between the upper cavity portion and the lower cavity portion; a button axially movably mounted on the valve seat; and a valve rod assembly connected to the button so as to follow the movement of the button, extending through the valve seat and into the upper cavity portion, and having a first position to seal the first hole and a second position to disengage from the first hole.

By means of its open end port, the switch valve assembly is adaptive to various types of mounting platforms and pipe joint assemblies, so as to provide various flow paths as needed. Accordingly, the adaptability and flexibility get improved.

In one embodiment, the switch valve unit further comprises a spring means positioned in the upper cavity portion between the diaphragm member and the valve seat. As a result, the diaphragm member can be deformed more smoothly, in particular at the time when the fluid pressure in the fluid path suddenly changes, so as to reduce the noise caused by deformation and vibration of the diaphragm member effectively.

In one embodiment, the spring means comprises a first spring, and a second spring sleeving over the first spring. Accordingly, the stability of spring means is improved.

In one embodiment, the second spring may include a puncturing member configured to extend into the second hole and move in respect of the diaphragm member. Accordingly, it facilitates puncturing the second through hole by means of the effectively relative movement between the puncturing member and the second hole, so as to improve prevention of blocking.

In one embodiment, the valve seat includes a central protrusion, and a surrounding wall surrounding the central protrusion at the top of the valve seat, and defines a receiving space for receiving the button between the central protrusion and the surrounding wall, wherein the central protrusion and/or the surrounding wall includes at least a vertical ridge and/or vertical groove, while the button includes at least a corresponding vertical ridge and/or vertical groove, and arranged between the button and the valve seat is a third spring. Accordingly, a simple anti-rotation and guide feature is formed between the valve seat and the button, so as to avoid circumferential movement when the button is pressed down, and enable the button to be successfully and smoothly pressed down or bounced up.

In one embodiment, the switch valve unit further comprises a cover member mounted on the button.

In one embodiment, provided between the cover member and the button are, a snap-fit means formed by cooperation between an expansion portion and a snap jaw, and an anti-rotation means formed by cooperation between a vertical ridge and a vertical groove. Accordingly, the connecting cooperation between the cover member and the button can make sure that the cover member is prevented from rotating when pressed, which improves stability of the cover member. Meanwhile, synchronous movement of the cover member and the button makes it easy for the operator to visualize the actual status of switch valve unit.

In another aspect, a switch valve unit is provided. The switch valve unit comprises a valve seat which defines a valve cavity; an at least partially axially deformable diaphragm member which is mounted in the valve cavity to divide the valve cavity into an upper cavity portion and a lower cavity portion having an open bottom end port, and provided with a first hole and a second hole spaced from each other and providing fluid communication between the upper cavity portion and the lower cavity portion; a button axially movably mounted on the valve seat; a valve rod assembly connecting to the button so as to follow the movement of the button, extending through the valve seat and into the upper cavity portion, and having a first position to seal the first hole and a second position to disengage from the first hole; and a cover member mounted on the button, arranged between the cover member and the button are an anti-rotation means and a snap-fit means.

By means of its open end port, the switch valve assembly is adaptive to various types of mounting platforms and pipe joint assemblies without suffering restriction by the flow path, and thereby has high adaptability. Furthermore, the cover member is reliably secured on the button in a compact way, so as to avoid the cover member from rotating when pressed, and improve stability of the cover member. Meanwhile, synchronous movement of the cover member and the button makes it easy for the operator to visualize the actual status of switch valve unit.

In one embodiment, the snap-fit means comprises an expansion portion formed on the cover member, and a snap member formed on the button and provided with an axial-extending cantilever and a snap jaw at a free end of the cantilever. Accordingly, a snap-fit means with simple structure is provided.

In one embodiment, the anti-rotation means comprises: formed on the cover member, first vertical ridges and first vertical grooves between the first vertical ridges; and formed on the button, second vertical ridges and second vertical grooves between the second vertical ridges, wherein the first vertical ridges are received in the second vertical grooves, and the second vertical ridges are received in the first vertical grooves. Accordingly, an anti-rotation means with simple structure is provided.

In one embodiment, the snap-fit means and the anti-rotation means are circumferentially spaced from each other.

In yet another aspect, a fluid switch is provided. The fluid switch comprises at least one pipe joint having an outer wall and an inner wall that defines a central cavity, wherein an annular cavity is defined between the outer wall and the inner wall; and the above-mentioned switch valve unit, wherein the valve seat is received in the pipe joint, the central cavity is in fluid communication with the first hole, and the annular cavity is in fluid communication with the second hole. Accordingly, the switch valve unit having the open end port can be fit into various pipe joints without suffering from restriction by the flow path.

In one embodiment, the at least one pipe joint comprises an inflow passage in fluid communication with the annular cavity, and an outflow passage in fluid communication with the central cavity.

In one embodiment, the inflow passage extends in a radial direction of the inner wall.

In one embodiment, at least a portion of the inflow passage extends in an axial direction of the inner wall.

In one embodiment, the outflow passage coaxially extends with the inner wall.

In one embodiment, the outflow passage extends in an axial direction of the inner wall, and is axially offset from the inner wall.

In one embodiment, the outflow passage extends in a radial direction of the inner wall.

In further another aspect, a kit of fluid switches is provided. The fluid switch kit comprises the aforesaid switch valve unit; and a pipe joint mounted with the switch valve unit, wherein the pipe joint is selected from one of the following groups: (a). a first pipe joint having an outer wall and an inner wall that defines a central cavity in fluid communication with a first hole, wherein an annular cavity in fluid communication with a second hole is defined between the outer wall and the inner wall, and the outer wall is integral with an inflow passage extending in a radial direction of the inner wall and in fluid communication with the annular cavity, and an outflow passage coaxially extending with the inner wall and in fluid communication with the central cavity; (b). a second pipe joint having an outer wall and an inner wall that defines a central cavity in fluid communication with a first hole, wherein an annular cavity in fluid communication with a second hole is defined between the outer wall and the inner wall, and the outer wall is integral with an inflow passage extending in a radial direction of the inner wall and in fluid communication with the annular cavity, and an outflow passage extending in a radial direction of the inner wall and in fluid communication with the central cavity; (c). a third pipe joint having an outer wall and an inner wall that defines a central cavity in fluid communication with a first hole, wherein an annular cavity in fluid communication with a second hole is defined between the outer wall and the inner wall, and the outer wall is integral with an inflow passage at least partially extending in an axial direction of the inner wall and in fluid communication with the annular cavity, and an outflow passage extending in a radial direction of the inner wall and in fluid communication with the central cavity; and (d). a fourth pipe joint having an outer wall and an inner wall that defines a central cavity in fluid communication with a first hole, wherein an annular cavity in fluid communication with a second hole is defined between the outer wall and the inner wall, and the outer wall is integral with an inflow passage extending in an axial direction of the inner wall and in fluid communication with the annular cavity, and an outflow passage axially offset from the inner wall and in fluid communication with the central cavity.

Other features and advantages of the present disclosure will be partially apparent to the person skilled in the art after reading this application document, and the others will be described in the following embodiments with reference to the accompanying drawings.

BRIEF DESCRIPTION OF THE DRAWINGS

The embodiments of the present disclosure will be detailed below in combination with the accompanying drawings, in which.

DETAILED DESCRIPTION

Figure 1:
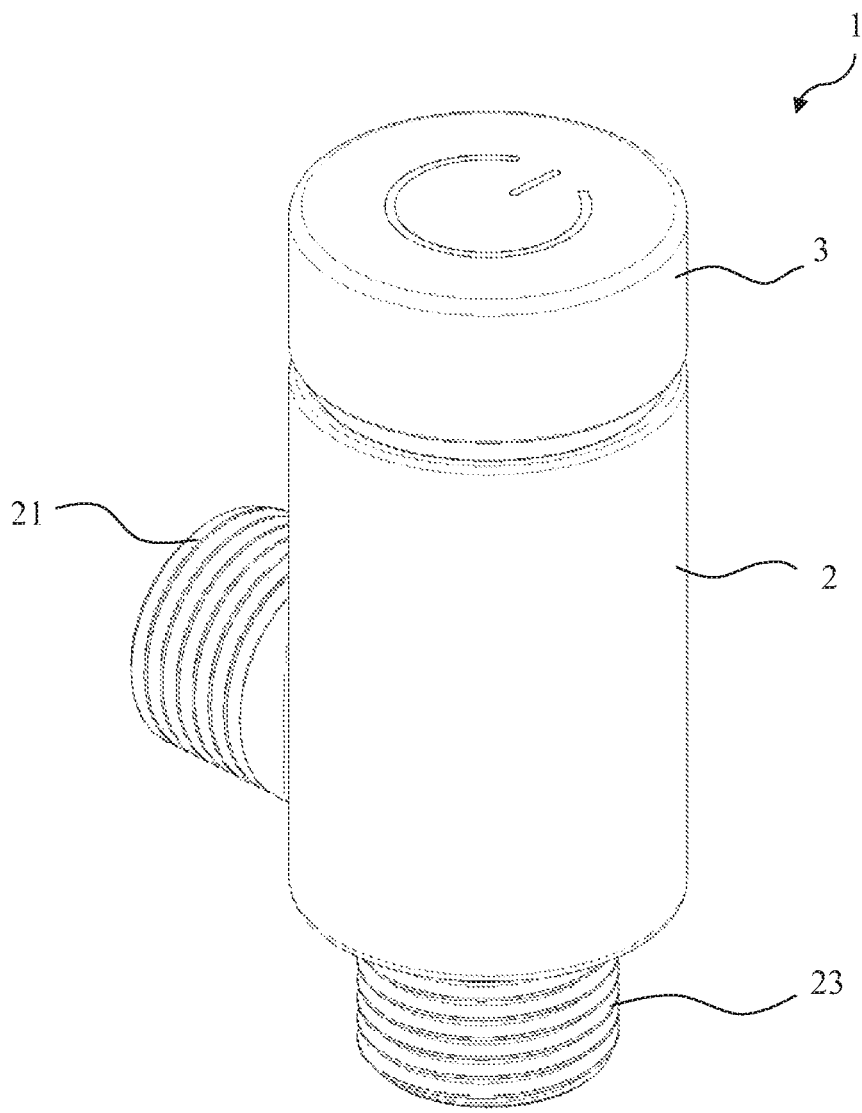
FIG. 1 is a schematic view of a fluid switch according to one embodiment of the present disclosure, with a cover member being pressed down.

In the present disclosure, like or similar reference signs refer to the like or similar features.

1. fluid switch; 2. pipe joint; 21. inflow passage; 211. oblique section; 213. first axial extending section; 215. second axial extending section; 23. outflow passage; 25. outer wall; 27. inner wall; 28. central cavity; 29. annular cavity; 3. cover member; 31. first vertical ridge; 33. first vertical groove; 35. narrowed segment; 37. expansion portion; 4. switch valve unit; 5. valve seat; 51. valve cavity; 510 upper cavity portion; 512. lower cavity portion; 514. end port; 53. first seat body; 530. seal ring; 532. tooth; 55. second seat body; 550. first upper protrusion; 552. second upper protrusion; 554. protrusion; 556. seal ring; 57. third seat body; 571. protrusion; 58. receiving space; 59. fourth seat body; 591. longitudinal rib; 592. guide feature; 593; groove; 594. positioning groove; 595. surrounding wall; 596. shoulder; 597. central protrusion; 599. vertical ridge; 6. button; 61. third spring; 63. cantilever; 631. snap jaw; 65. second vertical ridge; 67. second vertical groove; 69. vertical groove; 7. diaphragm member; 71. core portion; 710. first hole; 712. second hole; 714. first lower protrusion; 716. second lower protrusion; 72. elastic portion; 720. first elastic segment; 722. bended portion; 724. second elastic segment; 726. protuberance; 74. first spring; 76. second spring; 761. puncturing member; 8. valve rod assembly; 81. rod; 83. plunger portion; 831. hollow cylinder; 833. head portion; 835. extension part; 85. fourth spring; 87. first switch core; 871. first ramp surface; 872. gasket; 873. first vertical surface; 875. side protuberance; 89. second switch core; 891. lug; 893. third ramp surface; 895. second vertical surface; 897. second ramp surface; 9. sleeve.

Exemplary aspects of the switch valve unit and fluid switch according to the present disclosure will be described now with reference to the accompanying drawings. Although the figures are provided to represent some embodiments of the present disclosure, the drawings are not required to be drawn in scale, and some features can be exaggerated, removed or cross-sectioned to better illustrate and explain the present disclosure. The term "in the drawing" or similar terms used herein do not necessarily refer to all the accompanying drawings or examples.

Some directional terms, such as "inside", "outside", "top" and "bottom", used herein for describing the accompanying drawings will be understood to have their normal meaning and will refer to those directions as the drawings are normally viewed. Unless otherwise stated, the directional terms of the description generally refer to the conventional directions as understood by the person skilled in the art.

The terms like "first", "first one", "second", "second one" or any similar terms used herein have no indication on any sequence, quantity or importance in the present disclosure, but are used to distinguish one component from the other.

Figure 2:
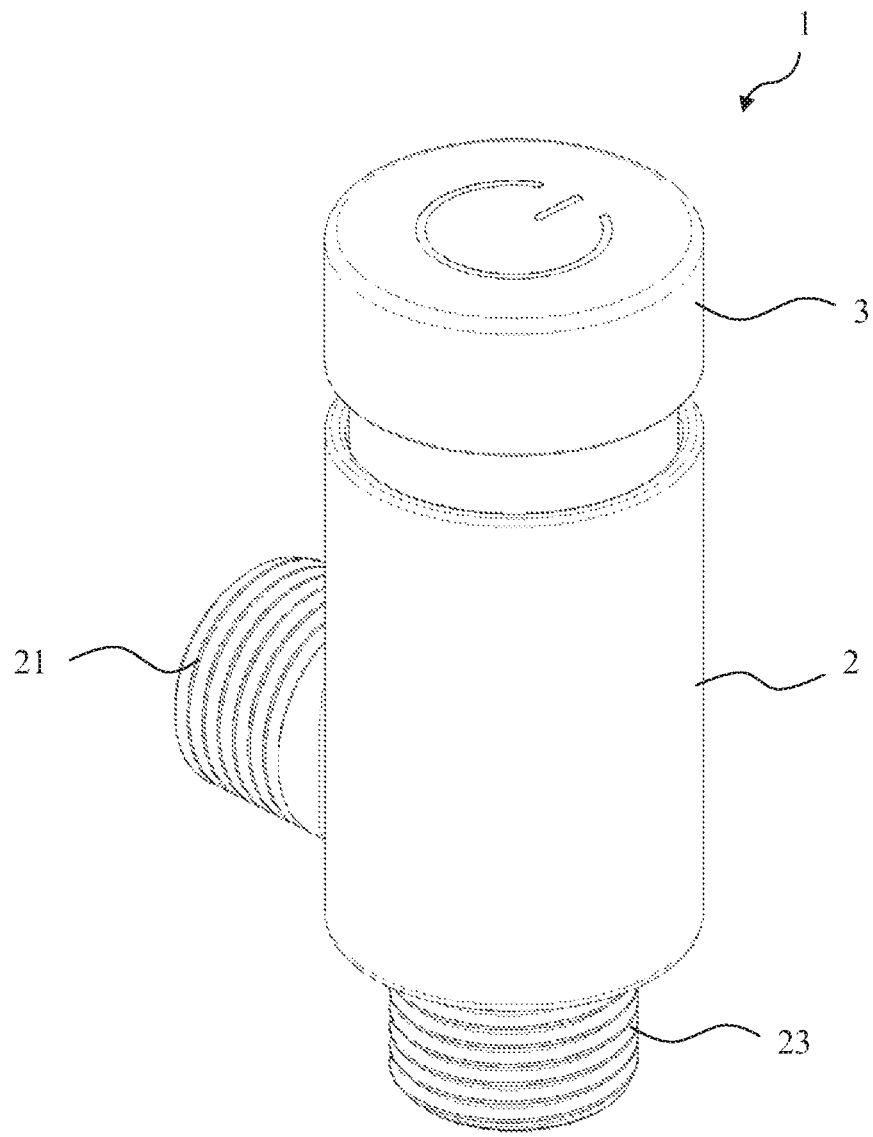
FIG. 2 is a schematic view of the fluid switch in FIG. 1, with the cover member bounced up.

FIGS. 1 and 2 generally show a fluid switch 1, which may be applicable, for example, to liquid flow paths, such as water paths or other fluid paths that can be conceived by the person skilled in the art, such that the operator is allowed to control outflow of the fluid. Although not shown in the figures, handles, pipe fittings, panel and other components or assemblies may be typically combined in the application environment of the fluid switch. The fluid switch 1 according to the present disclosure will be provided in details below.

Figure 3:
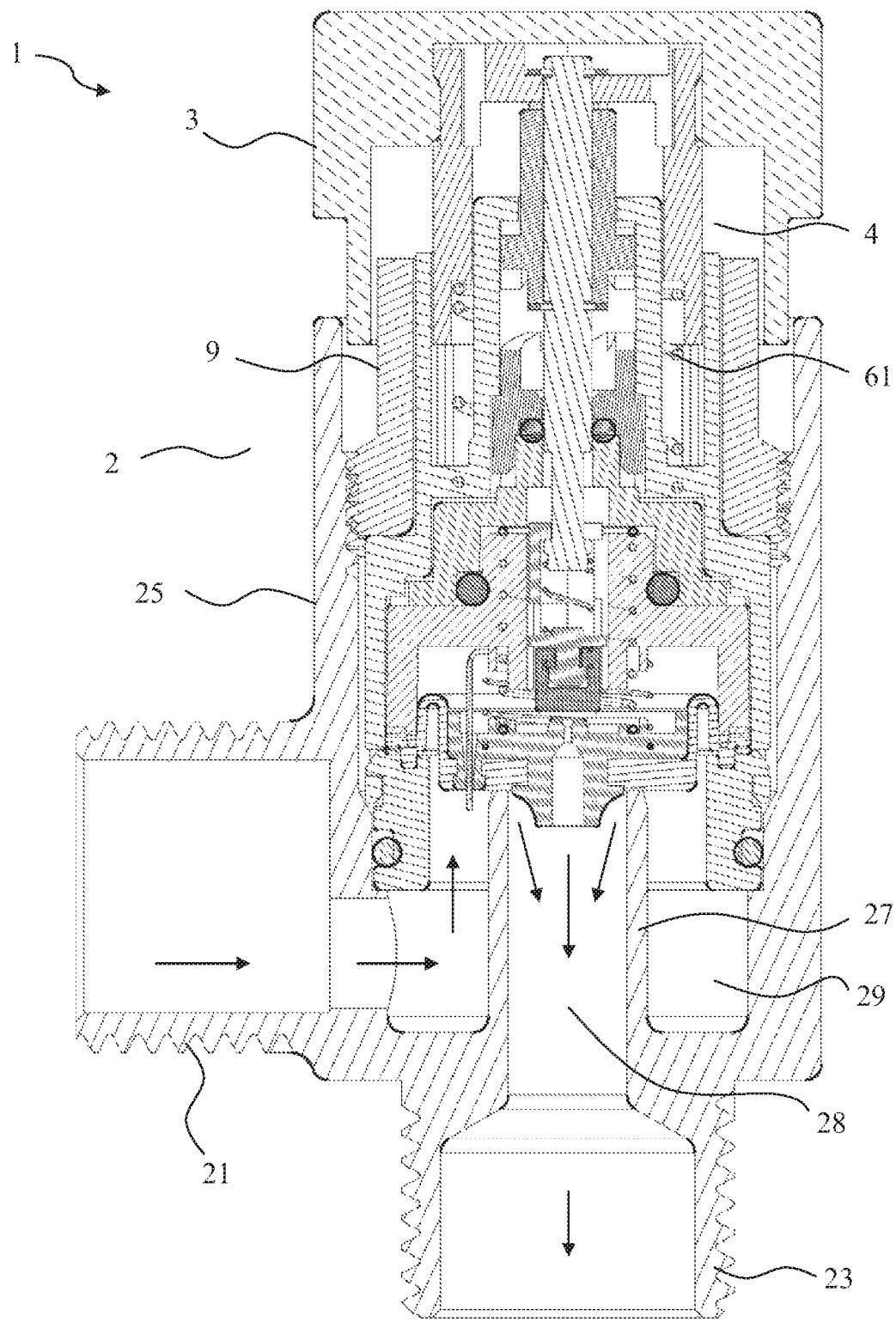
FIG. 3 is a sectional view of the fluid switch according to FIG. 1, with a side-in and bottom-out flow path defined in a pipe joint.

Referring to FIGS. 1 to 3, the fluid switch 1 may generally comprise a pipe joint 2 and a switch valve unit 4 received in the pipe joint 2. As shown in FIG. 3, the pipe joint 2 includes a substantially cylindrical outer wall 25 and an annular inner wall 27, which defines a central cavity 28. An annular cavity 29 is defined between the outer wall 25 and the inner wall 27. An inflow passage 21 of the pipe joint 2 is arranged to laterally extend into the outer wall 25 and to be in fluid communication with the annular cavity 29. An outflow path 23 of the pipe joint 2 is arranged to protrude out of the outer wall 25 from its lower end and to be in fluid communication with the central cavity 28. In the embodiment shown in FIG. 3, the inflow passage 21 substantially extends radially into the outer wall 25, and the outflow passage 23 substantially extends coaxially along the outer wall 25. Referring to FIG. 3, in the embodiment as shown, the switch valve unit 4 is fixedly mounted in the pipe joint 2 by means of a sleeve 9 which engages with the outer wall 25 of the pipe joint 2.

Referring to FIGS. 6 to 9, the switch valve unit 4 is shown in details. As illustrated, the switch valve unit 4 may comprise a cover member 3, a valve seat 5, a button 6, a diaphragm member 7, and a valve rod assembly 8. Defined within the valve seat 5 is a valve cavity 51 having an opened side which forms an end port 514 (see FIG. 7) for coupling the switch valve unit 4 to the inflow passage 21 of the pipe joint 2. The cover member 3 and the button 6 are connected to and axially movable with respect to each other. The diaphragm member 7 is mounted in the valve cavity 51 of the valve seat 5, and is configured to be axially deformable under a fluid pressure. The valve rod assembly 8 is connected to the button 6, and arranged to extend through the valve seat 5 towards the diaphragm member 7.

Figure 4:
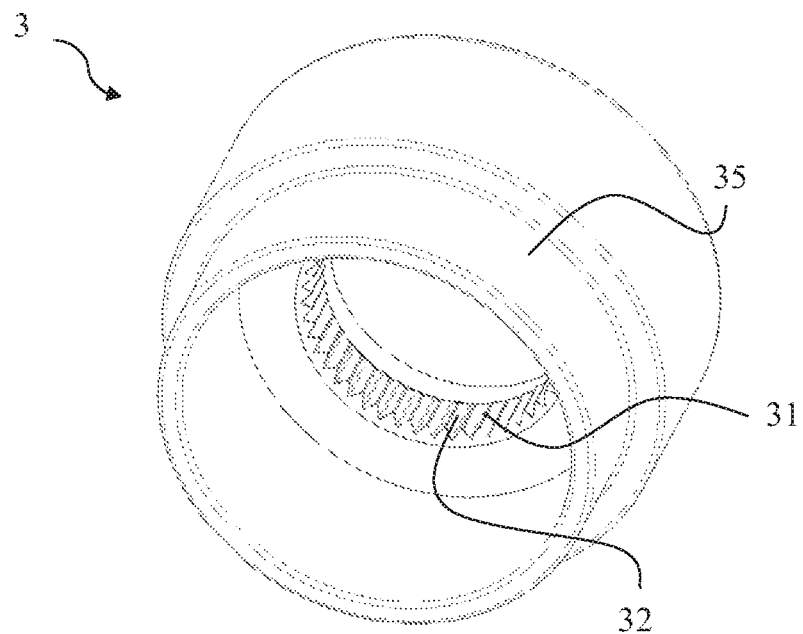
FIG. 4 is a perspective view of the cover member of the fluid switch according to FIG. 1.
Figure 5:
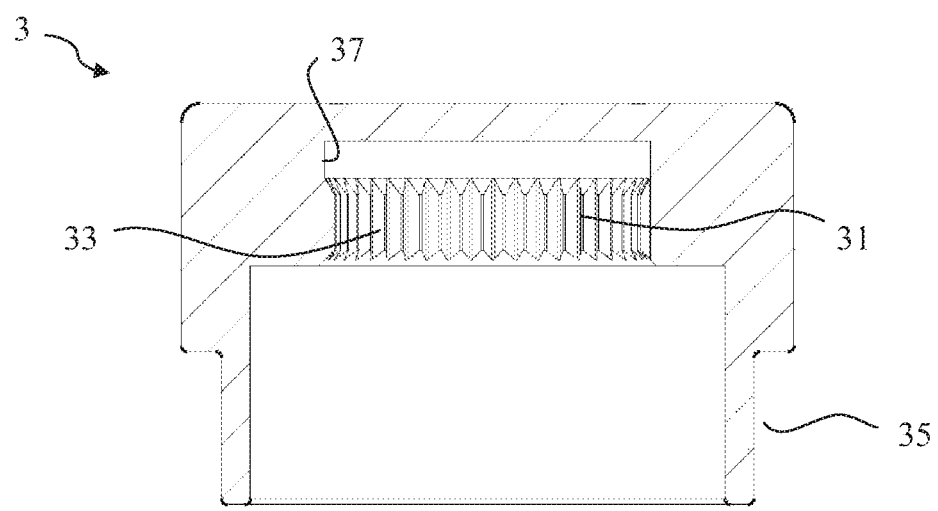
FIG. 5 is a sectional view of the cover member of the fluid switch according to FIG. 1.

The cover member 3 is axially movable along the pipe joint 2 under an external force (e.g. manual press). FIG. 1 is a schematic view showing when the cover member 3 has been pressed down in the axial direction, and FIG. 2 is a schematic view showing when the cover member 3 is bounced up in the axial direction. The cover member 3 is shown in FIGS. 4 and 5 in details. As illustrated, formed at a lower portion of the cover member 3 is a narrowed segment 35 which is configured to be received in the outer wall 25, such that the axial length of fluid switch 1 is minimized, without inferencing the axial movement of cover member 3.

Further referring to FIGS. 4 and 5, the inner bore of cover member 3 includes a lower section with a greater diameter, and an upper section with a smaller diameter. A plurality of first vertical ridges 31 are circumferentially arranged on the circumferential wall of upper section, and a plurality of first vertical grooves 33 are formed between the first vertical ridges 31. In the upper section, an expansion portion 37 is formed in the axial direction above the first vertical ridges 31 and the first vertical grooves 33. The first vertical ridges 31, the first vertical grooves 33 and the expansion portion 37 are configured to form positioning cooperation with the button 6.

Figure 6:
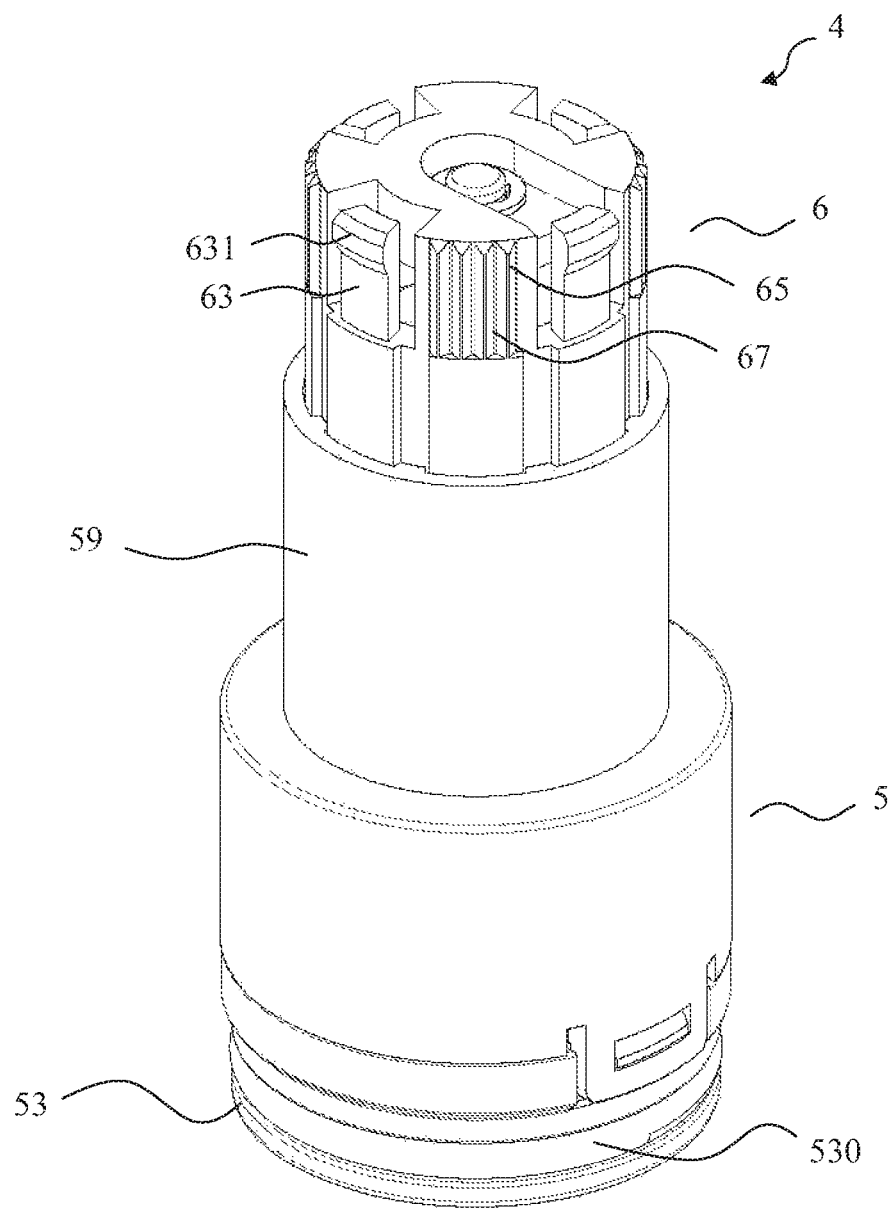
FIG. 6 is a schematic illustration of a switch valve unit according to one embodiment of the present disclosure.
Figure 7:
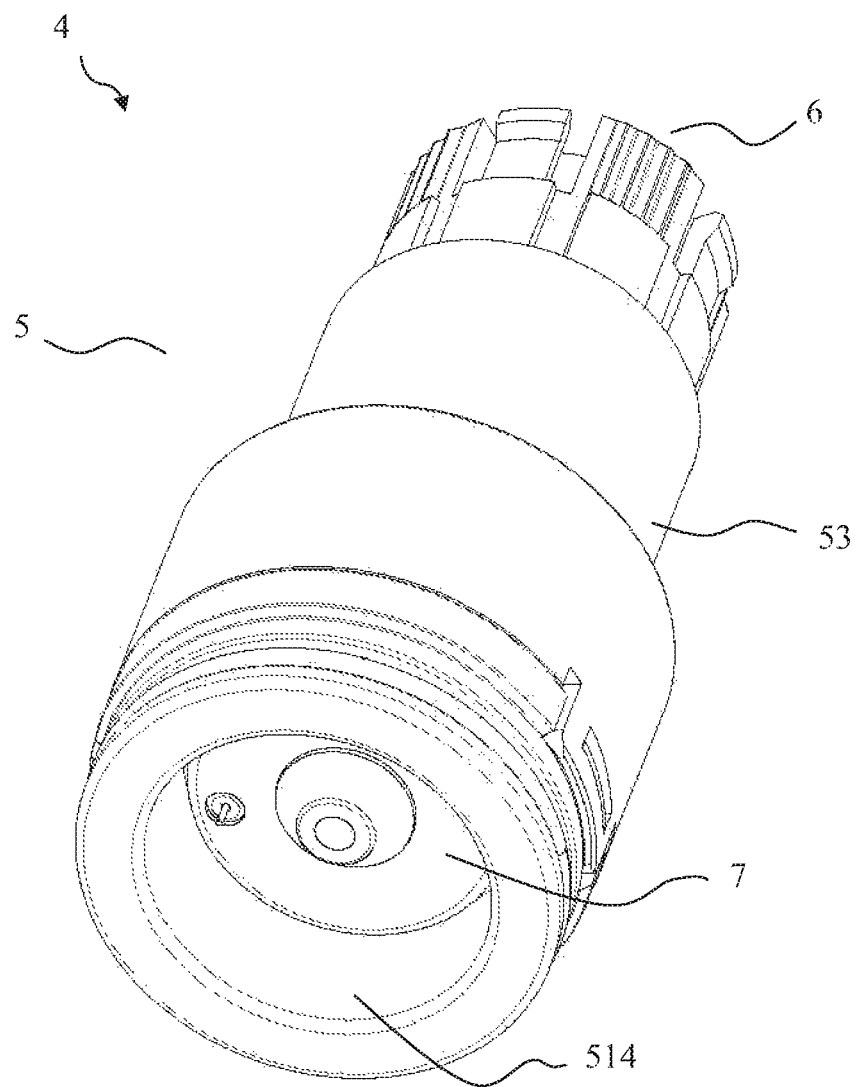
FIG. 7 is a schematically bottom view of the switch valve unit according to FIG. 6, with an end port of the switch valve unit shown.
Figure 8:
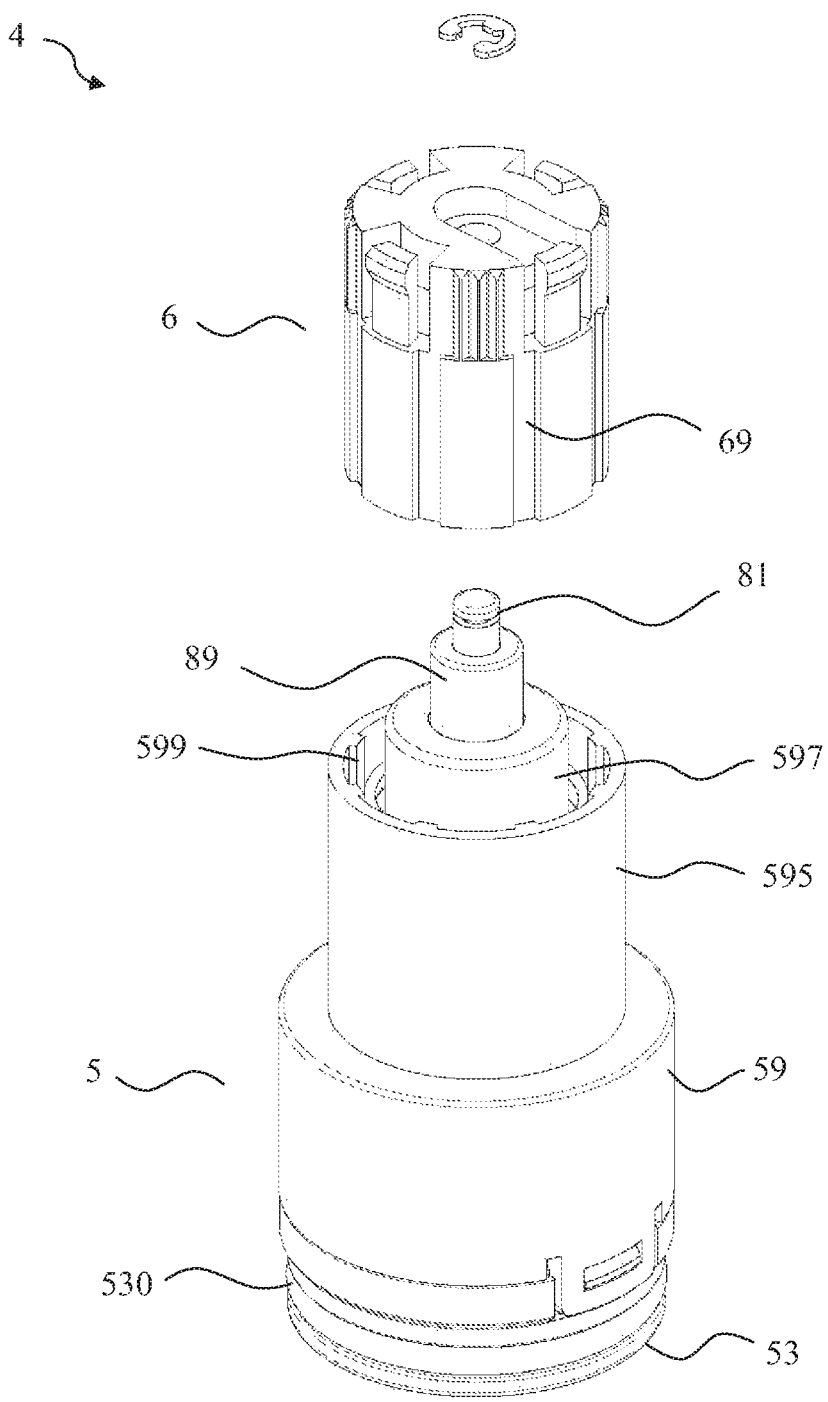
FIG. 8 is a schematic view of the switch valve unit according to FIG. 6, with the button detached from the valve seat.

The button 6 which is mounted on the valve seat 5 is connected to the cover member 3 and movable therewith. Referring to FIGS. 6 to 8, a plurality of sets of concave-convex features are circumferentially arranged on the button 6. Each set of the concave-convex features comprises a plurality of circumferentially arranged second vertical ridges 65, and a plurality of second vertical grooves 67 formed between the second vertical ridges 65. In the engagement condition, the second vertical ridges 65 of button 6 are received in the first vertical grooves 33 of cover member 3, while the first vertical ridges 31 of cover member 3 are received in the second vertical grooves 67 of button 6, such that a simple anti-rotation means is formed between the button 6 and cover member 3. Additionally, with the aim to form synchronous movement of the button 6 and cover member 3, the button 6 preferably comprises a cantilever 63 extending in the axial direction, with a snap jaw 631 protruding outwards on a free end of the cantilever 63 which is configured to be snapped into the expansion portion 37 of cover member 3 to form snap-fit for preventing axially relative movement. Alternatively, in one embodiment not shown, the snap-fit can be formed by engagement between a groove on the cantilever 63 and a snap jaw on the cover member 3. Although the concave-convex features and the cantilever 63 of the button 6 are circumferentially spaced along the button 6 as shown, other arrangements are also conceivable to the person skilled in the art. For example, in one embodiment not shown, the snap jaw 631 of the button 6 is positioned below second vertical ridges 65 in the axial direction.

Figure 9:
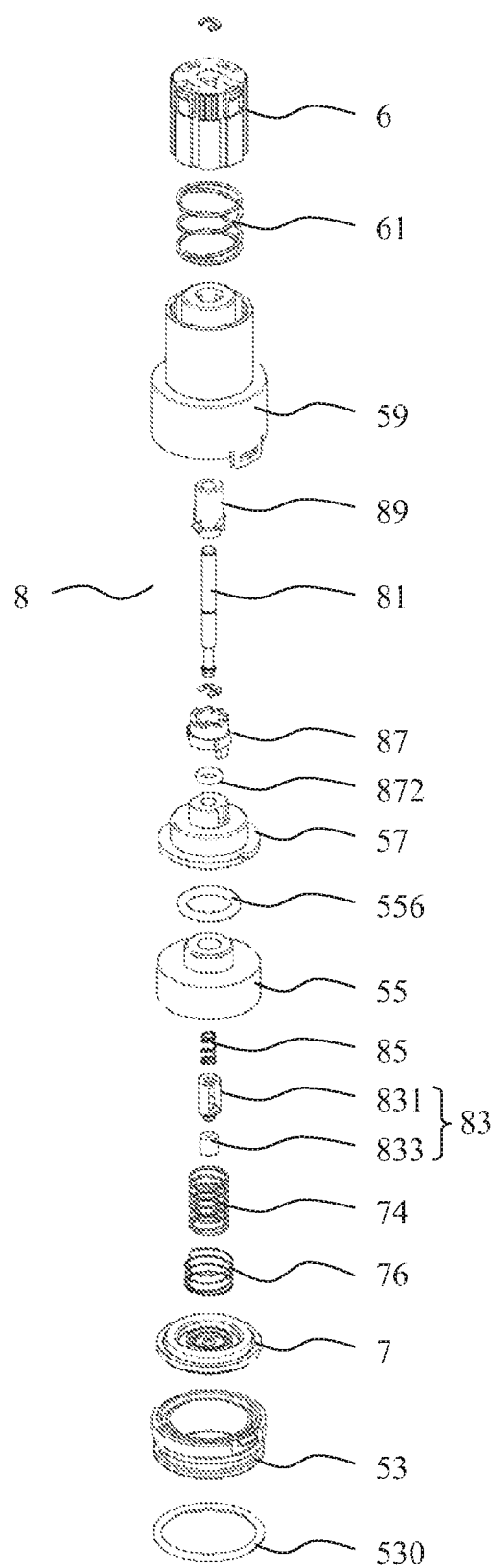
FIG. 9 is a schematically exploded view of the switch valve unit according to FIG. 6.
Figure 10:
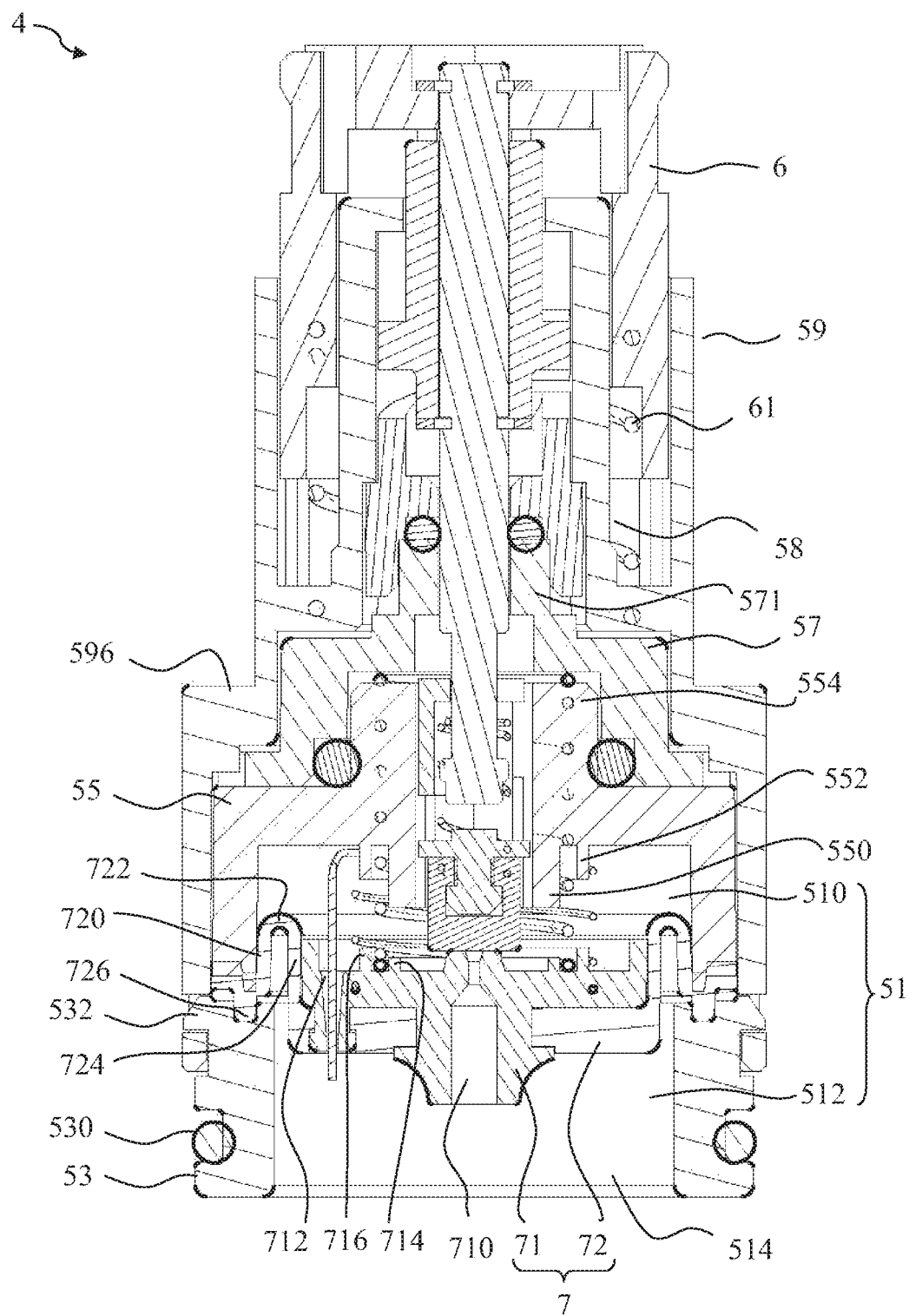
FIG. 10 is a sectional view of the switch valve unit according to FIG. 6, wherein a valve rod assembly is at a first position.
Figure 11:
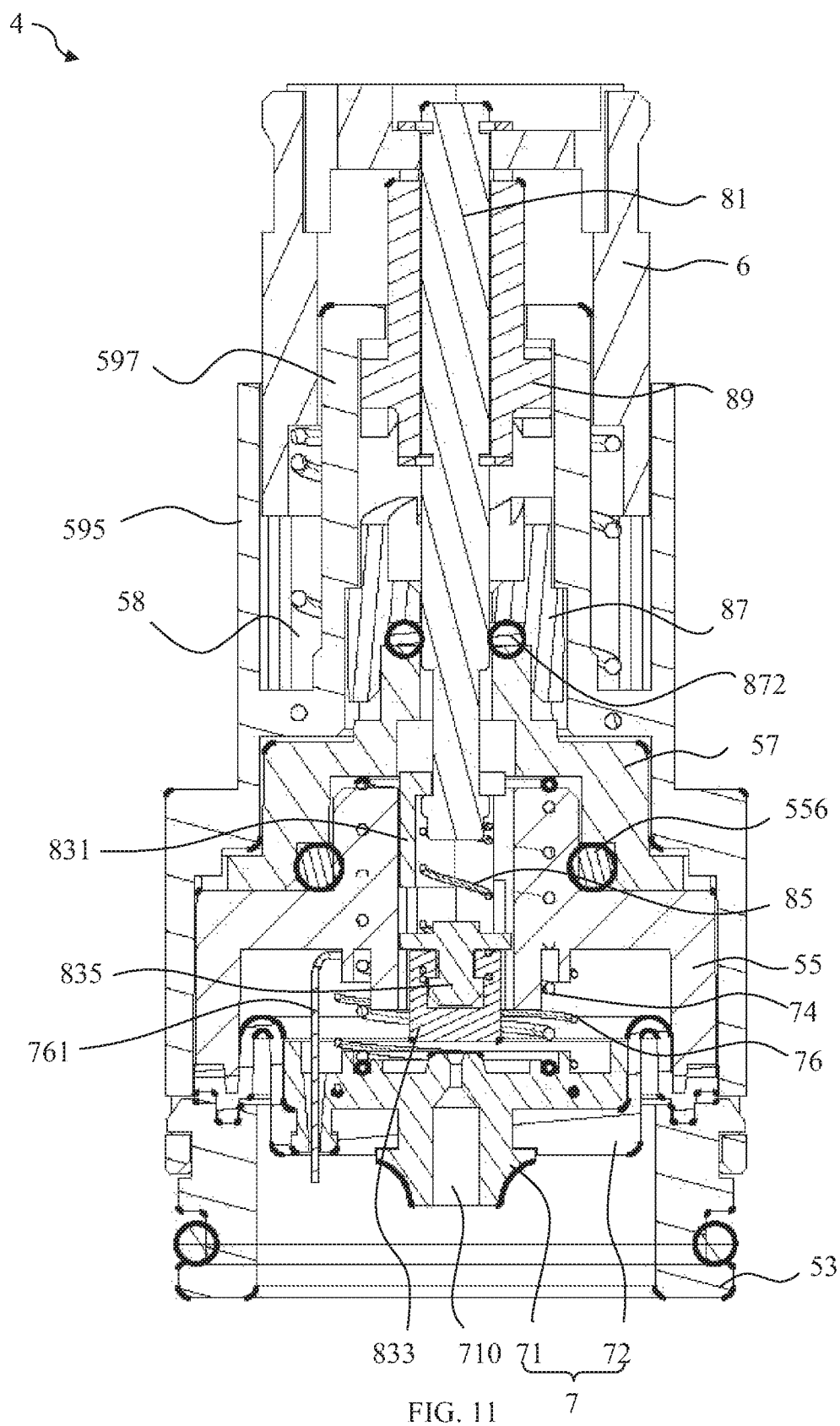
FIG. 11 is a sectional view of the switch valve unit according to FIG. 6, wherein a valve rod assembly is at a second position.

Referring to FIGS. 9 to 11, the valve seat 5 comprises a first seat body 53, a second seat body 55, a third seat body 57 and a fourth seat body 59 which are releasably connected to each other. The substantially cylindrical first seat body 53 is positioned on a stop protuberance formed inside the outer wall 25, and is provided with a circumferential groove on its outer periphery for receiving a seal ring 530, such that a gap between the first seat body 53 and the outer wall of the pipe joint 2 may be sealed. The first seat body 53 includes teeth 532 adjacent to the top surface of the first seat body 53. The second seat body 55 is mounted onto the first seat body 53 and together with the first seat body 53, defines a valve cavity 51, such that the above-mentioned end port 514 is formed at a bottom opening of the first seat body 53. The second seat body 55 includes an opening allowing the valve rod assembly 8 to pass through, and a protrusion 554 surrounding the said opening, such that the third seat body 57 can be inserted and sit on the second seat body 55. A seal ring 556 is arranged between the second seat body 55 and third seat body 57. The third seat body 57 includes an opening allowing the valve rod assembly 8 to pass through, and a protrusion 571 surrounding the opening for mounting at least a portion of the valve rod assembly 8.

The fourth seat body 59 is configured to cover over the second seat body 55 and third seat body 57. The fourth seat body 59 includes at its lower portion bayonets for snap-fit connection with the teeth 532 of first seat body 53, so as to firmly press the second and third seat bodies and prevent them from releasing from the top. The fourth seat body 59 includes on the outer periphery thereof a shoulder 596 in axial backstop cooperation with the bottom surface of sleeve 9. In addition, formed at the top of fourth seat body 59 is an opening allowing the valve rod assembly 9 to pass through. In one embodiment not illustrated, the valve seat 5 can alternatively be a unitary piece.

In the illustrated embodiment, the fourth seat body 59 comprises a central protrusion 597, and a surrounding wall 595 encircling the central protrusion 597. A receiving space 58 is formed between the central protrusion 597 and the surrounding wall 595, and the button 6 is configured to cover over the central protrusion 597 and is received in the receiving space 58. A third spring 61 is arranged between the button 6 and the fourth seat body 59. Accordingly, the entire axial length of stitch valve unit 4 is minimized, without inferencing the axial movement of button 6. Preferably, arranged on the outer periphery of the button 6 are vertical grooves 69, and arranged on the surrounding wall 595 of the fourth seat body 59 are vertical ridges 599 for correspondingly engaging into the vertical grooves 69, facilitating a vertical guide of the axial movement of the button 6, while preventing rotation thereof. Alternatively, in one embodiment not illustrated, the vertical grooves are formed on the surrounding wall 595 of fourth seat body 59, while the vertical ridges are formed on the outer periphery of the button 6. In another embodiment not illustrated, the vertical grooves are formed on the inner wall of the button 6, while the vertical ridges are formed on the outer periphery of the central protrusion 597 of the fourth seat body 59. In another embodiment not illustrated, the vertical grooves are formed on the outer periphery of the central protrusion 597, while the vertical ridges are formed on the inner wall of the button 6.

Referring to FIGS. 9 to 11, the valve rod assembly 8 is shown in details. As illustrated, the valve rod assembly 8 comprises a rod 81, a plunger portion 83, a first switch core 87 and a second switch core 89. The rod 81 includes a first end extending out of the valve seat 5 and connected to the button 6, such that the rod 81 is movable with the button 6. The rod 81 includes a second end extending through the openings of the fourth seat body 59, the third seat body 57 and the second seat body 55, and into the valve seat 5. The plunger portion 83 is mounted at the second end of rod 81. In the illustrated embodiment, the plunger portion 831 comprises a hollow cylinder 831 nested over the rod 81, and a head portion 833 mounted on the hollow cylinder 831. The rod 81 is configured to extend into the hollow cylinder 831 and to be axially movable with respect of the hollow cylinder 831. A radial protuberance is formed at the second end of the rod 81, and a stop surface is formed on the inner wall of the hollow cylinder 831. Accordingly, a fourth spring 85 is arranged between the radial protuberance of the rod 81 and the stop surface of the hollow cylinder 831. Formed on an end of the hollow cylinder 831 which faces the valve cavity 51 of the valve seat 5 is an extension part 835, inserting into and snapping into the head portion 833. The hollow cylinder 831 may be made from rigid material, such as the metal like copper, and the head portion 833 may be made from elastic material like rubber. In one embodiment not illustrated, the hollow cylinder 831 is integral with the head portion 833. In another embodiment not illustrated, the hollow cylinder 831 includes an elastic end surface towards the water-flow cavity 51, in place of the head portion 833.

Figure 12:
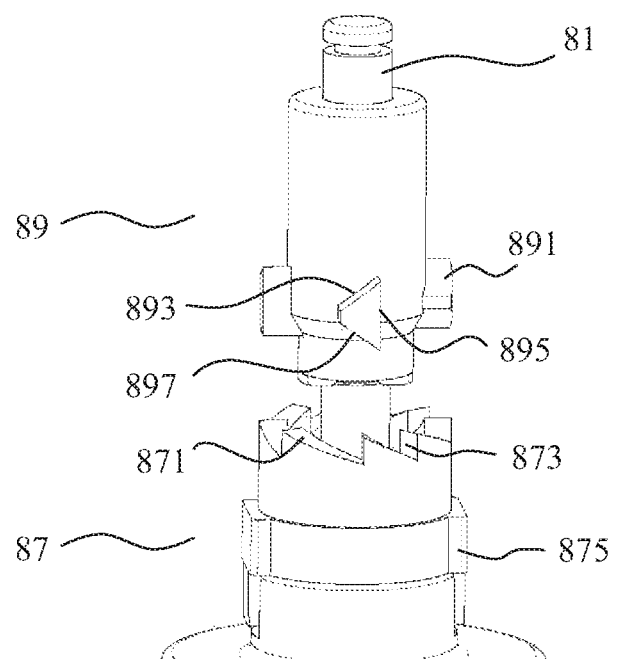
FIG. 12 is a schematic view of a first switch core and a second switch core according to one embodiment of the present disclosure.
Figure 13:
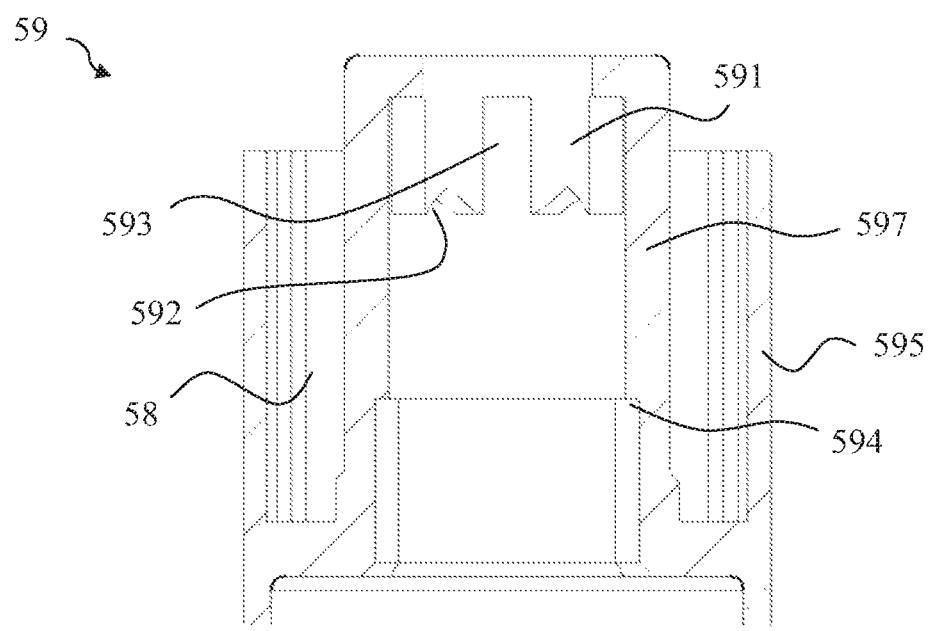
FIG. 13 is a schematically detailed view of a fourth valve seat according to one embodiment of the present disclosure.

Referring to FIGS. 12 and 13, the first switch core 87 is rotatably arranged over the rod 81, and is rested on the protrusion 571 of the third seat body 57. formed on the inner wall of fourth seat body 59 is a positioning groove 594 (see FIG. 13), into which a side protuberance 875 of the first switch core 87 so as to circumferentially position the first switch core 87. In one embodiment not illustrated, an opening is formed to pass through the wall of the fourth seat body 59, in place of the positioning groove 594. A gasket 872 is arranged between the first switch core 87 and the protrusion 571 of the third seat body 57. A plurality of circumferentially spaced first ramp surfaces 871 are formed on the top surface of first switch core 87 away from the third seat body 57, and a first vertical surface 873 is provided for connecting each of the two adjacent first ramp surfaces 871.

The second switch core 89 is fixedly nested over, and thus moveable together with the rod 811. Referring to FIG. 12, a plurality of lugs 891 are circumferentially arranged at a portion of the second switch core 89 which is configured to extend into the central protrusion 597 of the fourth seat body 59. The lugs 891 each comprises a second ramp surface 897 on the bottom side thereof for cooperating with the first ramp surface 871, a third ramp surface 893 on the top side thereof configured to intersect with the second ramp surface 897, and a second vertical surface 895 connecting the second ramp surface 897 and third ramp surface 893 to each other and facing the first vertical surface 973. Referring to FIG. 13, to cooperate with the second switch core 89, circumferentially arranged at the top of fourth seat body 59 are a plurality of longitudinal ribs 59, and grooves 593 between the longitudinal ribs 591. Preferably formed on the bottom side of ribs 591 are concave guide features 592 which each are defined by two intersecting ramp surfaces.

When the lugs 891 of second switch core 89 are arranged against the guide features 592 of the longitudinal ribs 591 of the fourth seat body 59, with reference to FIG. 10, the plunger portion 831 is pressed against the diaphragm member 7, such that the entire valve rod assembly 8 is at a first position. It is visible that the cover member 3 is in the pressed-down status as shown in FIG. 1.

When in the status the cover member 3 is further pressed down, the button 6 and rod 81 are brought to move downwards synchronously, the downward movement of second switch core 89 on the rod 81 causes the lugs 891 to disengage from the guide features 592 and thereby makes the second ramp surfaces 897 rest against the first ramp surfaces 871. By means of guide of the first ramp surface 871, the second switch core 89 is rotated until the second vertical surface 895 is stopped by the first vertical surface 873. Then the cover member 3 is released, the button 6 and rod 81 are brought to move upwards synchronously, the second switch core 89 is moved away from the first switch core 87 until the lugs 891 enter the grooves 593 adjacent to the longitudinal ribs 591. At that time the plunger portion 83 is pulled up by the rod 81, such that the head portion 833 is separated from the diaphragm member 7. Referring to FIG. 11, when the cover member 3, button 6 and valve rod assembly 8 stop movement, a gap is formed between the head portion 833 and the diaphragm member 7, such that the entire valve rod assembly 8 is at a second position. It is visible from the exterior that the cover member 3 is in the bounced-up status as shown in FIG. 2.

When to switch the status, the cover member 3 just needs to be pressed down again, the button 6 and rod 81 are brought to move downwards synchronously, the second switch core 89 is caused to disengage from the grooves 593, and then comes close to the first switch core 87, such that the switch core is rotated by a certain angle by means of the guide of the first ramp surface 871. Afterwards, the cover member 3 is released, such that the button 6, rod 81 and second switch core 89 are brought to move upwards synchronously, until the second switch core 89 enters the guide features 592 of the adjacent longitudinal ribs 591. At that time the entire valve rod assembly 8 is switched to the first position again, and the cover member 3 is again in the pressed-down status as shown in FIG. 1. Because of the gap between the inner wall of the hollow cylinder 831 and the radial protuberance of the rod 81, the plunger portion 83 will not be pulled up by the rod 81. Consequently, the plunger portion 83 is secured to press against the diaphragm member 7.

Although a specific valve rod assembly 8 is illustrated above, such illustration is merely exemplary demonstration for disclosure. Other valve rod assemblies are conceivable to the person skilled in the art.

Referring to FIGS. 10 and 11, the diaphragm member 7 is positioned in the valve cavity 51 of the valve seat 5, and divides the valve cavity 51 into an upper cavity portion 510 and a lower cavity portion 512. In the illustrated embodiment, the diaphragm member 7 comprises a core portion 71 and an elastic portion 72 surrounding the core portion 71. The elastic portion 72 includes a first elastic segment 720 interposed between the first seat body 53 and the second seat body 55, a second elastic segment 724 surrounding the core portion 71, and a bended portion 722 connecting the first elastic segment 720 and the second elastic segment 724. As shown in the figures, preferably a protuberance 726 is arranged on the first elastic segment 720, and a corresponding groove is arranged at the top surface of the first seat body 52 for receiving the protuberance 726. The protuberance 726 can be in form of a plurality of circumferentially spaced small lugs, or a circumferentially extending elongate lug. In one embodiment not illustrated, the groove is formed on the first elastic segment 720, while the corresponding lug is arranged on the top surface of first seat body 52. The second elastic segment 724 is hung in the water-flow cavity 51.

The core portion 71 is mounted in the second elastic segment 724. Preferably the core portion 71 is configured to snap into the second elastic segment 724 to prevent the central portion 71 from detaching from the elastic portion 72. In one embodiment not illustrated, the diaphragm member 7 is an integral piece, with its outer periphery to be an elastic deformable portion. The core portion 71 includes a first hole 710 in communication with the central cavity 28, and a second hole 712 in fluid communication with the annular cavity 29. Preferably the first hole 710 is located in the center of diaphragm member 7, and the second hole 712 is offset from the middle. Further preferably, one end of the first hole 710 which is adjacent to the plunger portion 83 has a diameter that is smaller than that of the other end, while one end of the second hole 712 which is adjacent to the plunger portion 83 has a diameter that is greater than that of the other end. When the valve rod assembly 8 is at the first position, the first hole 710 is sealed by the plunger portion 83. When the valve rod assembly 8 is at the second position, the plunger portion 83 is spaced from the first hole 710 such that the upper cavity portion 510 is in fluid communication with the lower cavity portion 512 via the first hole 710.

In one preferable embodiment, a first spring 74 is placed between the second seat body 55 and the core portion 71, to reduce the noise caused by deformation of the diaphragm member 7. In the illustrated embodiment, the second seat body 55 has a first upper protrusion 550 protruding towards the diaphragm member 7 and surrounding the first hole 710, the core portion 71 has a first lower protrusion 714 corresponding to the first upper protrusion 550, and the first spring 74 is arranged over the first upper protrusion 550 and first lower protrusion 714.

The second hole 712 has a relatively small diameter and thus is prone to be blocked by the impurities in the fluid. Therefore, it is preferable to provide an anti-impurity member in the second hole 712. In the illustrated embodiment, a second spring 76 is placed between the second seat body 55 and the core portion 71, and includes a puncturing member 761 for penetrating through the second hole 712 at the end of the second spring 76 adjacent to the second seat body 55. The puncturing member 761 ha a diameter that is smaller than that of the second hole 712. The core portion 71 is movable in respect of the puncturing member 761 when the elastic portion 72 performs deformation, such that the puncturing member 761 performs the function of preventing from block of the second hole 712. To facilitate mounting of the second spring 76, it is preferable that the second seat body 55 has a second upper protrusion 552 protruding towards the diaphragm member 7 and surrounding the first upper protrusion 550, the core portion 71 has a second lower protrusion 716 corresponding to the second upper protrusion 552, and the second spring 76 is arranged over the second upper protrusion 552 and second lower protrusion 716, such that the second spring 76 sleeves over the first spring 74.

The form of anti-impurity member is illustrated herein only in an exemplary way, but the person skilled in the art can contemplate alternative structures. For example, in one embodiment not illustrated, a penetrating member for insertion into the second hole 712 is integrally formed with the end surface of the second seat body 55 which faces the diaphragm member 7. In another embodiment not illustrated, a ring is securely nested over the second upper protrusion 552 of the second seat body 55, and the ring includes an integrally penetrating member for insertion into the second hole 712. Any other forms of the anti-impurity member can be used, as long as it is able to penetrate through the second hole 712 and is movable in respect of the diaphragm member 7, falling within the scope of present disclosure.

The operation of the fluid switch 1 according to an embodiment of present disclosure will be described below in details with reference to the aforementioned examples.

Referring to FIG. 3, when the cover member 3 is pressed down, the valve rod assembly 8 is at the first position in which the first hole 710 of diaphragm member 7 is sealed by the plunger portion 83. Consequently, the fluid flows from the inflow path 21, through the annular cavity 29 and into the end port 514 of the valve seat 5, and then it flows through the second hole 712 and slowly into the upper cavity portion, such that the fluid pressure within the upper cavity portion 510 may increase gradually, so as to press a float device 7 against the upper end of the inner wall 27. In this case, the fluid cannot flow into the central cavity 28 and the outflow path 23.

When the cover member 3 is bounced up, the valve rod assembly 8 is at the second position, in which the plunger portion 83 is spaced from the second hole 710 of the float device 7. Consequently, the fluid in the upper cavity portion 510 may flow through the first hole 712 and into the central cavity 28, such that the pressure in the upper cavity portion 510 may be released and the fluid pressures between the upper cavity portion 510 and the lower cavity portion 512 become balanced. Consequently, the fluid flows from the inflow path 21, through the annular cavity 29 and into the end port 514 of the valve seat 5, and then it may impact the diaphragm member 7 to axially deform its elastic portion 72, such that a gap is formed between the diaphragm member 7 and the upper end of inner wall 27. As a result, the fluid may flow into the central cavity 28 through the gap between the diaphragm member 7 and the upper end of inner wall 27.

FIGS. 1 to 13 illustrate multiple embodiments of the fluid switch. In these embodiments, the switch valve unit 4 cooperates with the pipe joint 2 having a "side-in and bottom-out" flow path. Since the end port 514 of the switch valve unit 4 is configured to be an open form, it can be applicable to various pipe joint having any flow path without re-design.

Figure 14:
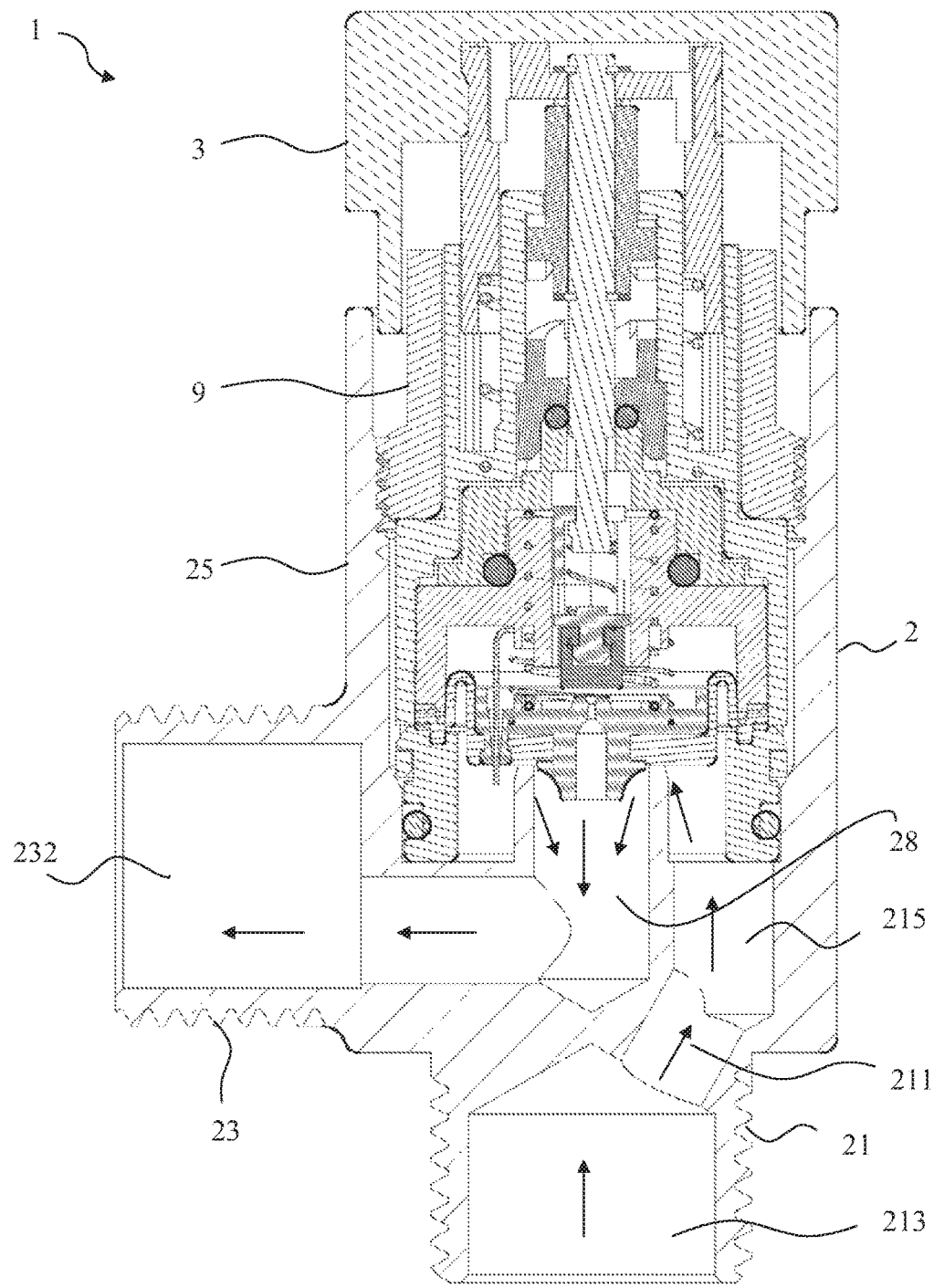
FIG. 14 is a sectional view of a fluid switch according to another embodiment of the present disclosure, with a bottom-in and side-out flow path defined in a pipe joint.

For example, referring to FIG. 14, another embodiment of the fluid switch 1 is illustrated. It utilizes the above-mentioned switch valve unit 4, and differs in being applied to a pipe joint 2 having different flow path. As illustrated, the outflow path 23 of the pipe joint 2 substantively extends out of the outer wall 25 in the radial direction. The inflow path 21 has a first axial extending section 213, a second axial extending section 215, and an oblique section 211 connecting the axial extending sections to each other. Consequently, the switch valve unit 4 is applied to the pipe joint 2 having a "bottom-in and side-out" flow path.

Figure 15:
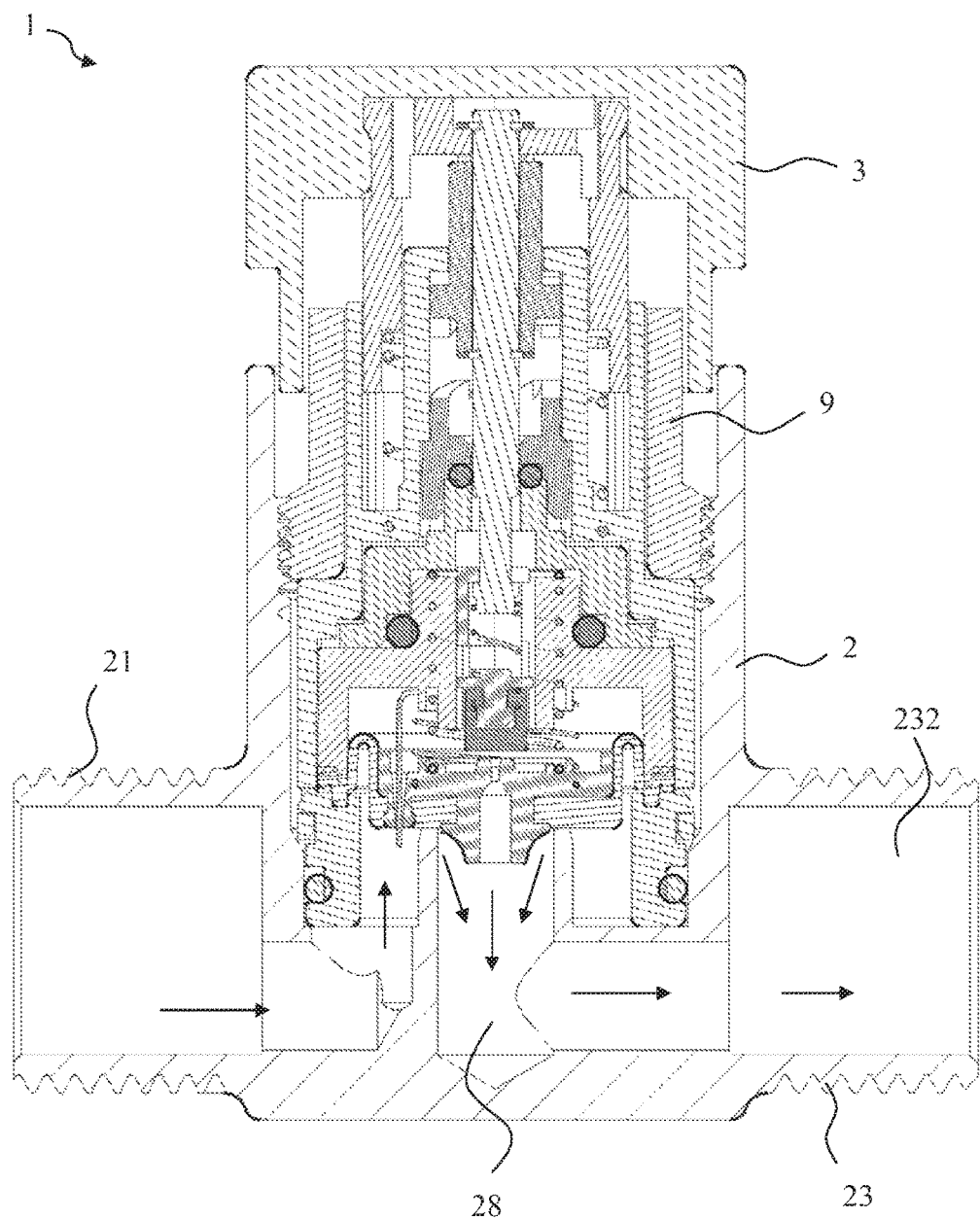
FIG. 15 is a sectional view of a fluid switch according to another embodiment of the present disclosure, with a side-in and side-out flow path defined in a pipe joint.

Referring to FIG. 15, another embodiment of the fluid switch 1 is illustrated. It uses the above-mentioned switch valve unit 4, and differs in being applied to a pipe joint 2 having a different flow path. As illustrated, the outflow path 23 and the inflow path 21 of pipe joint 2 extend out of and into the outer wall 25 in the radial direction, respectively.

Consequently, the switch valve unit 4 is applied to the pipe joint 2 having a "side-in and side-out" flow path.

Figure 16:
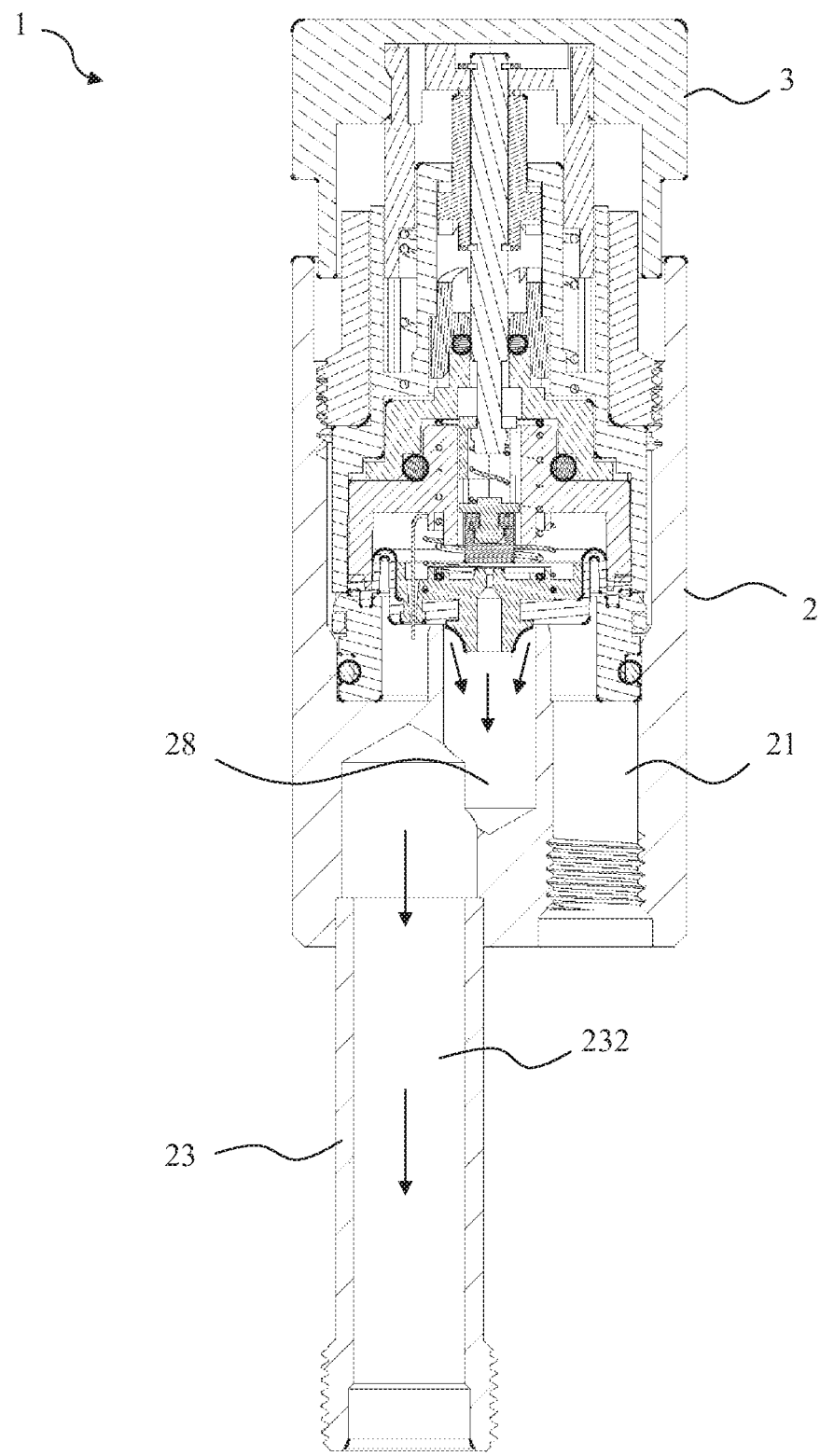
FIG. 16 is a sectional view of a fluid switch according to another embodiment of the present disclosure, with a bottom-in and bottom-out flow path defined in a pipe joint.

Referring to FIG. 16, another embodiment of the fluid switch 1 is illustrated. As shown in the figure, the outflow path 23 of pipe joint 2 extends out of the outer wall 25 in the axial direction, and is axially spaced from the inner wall 27. The inflow path 21 is formed in the outer wall 25. Consequently, the switch valve unit 4 is applied to the pipe joint 2 having a "bottom-in and bottom-out" flow path.

Although the cooperation of the pipe joint 2 and switch valve unit 4 of the embodiments is illustrated, other embodiments of the pipe joint having different flow paths are also conceivable.

It should be understood that although the embodiments illustrated are described individually, the embodiments should not be interpreted containing only one single aspect of the invention. The way of description is merely for clarity, and a person skilled in the art shall consider the description as a whole, and understand each embodiment described herein can be properly combined with each other to form a further embodiment.

The above description is merely construed to describe exemplary embodiments of present disclosure, not for limiting the scope of present disclosure. Equivalences, changes, modifications and combination can be made by the person skilled in the art without departing from the spirit and principle of present disclosure, which shall fall within the scope of present disclosure.

What is claimed is:

1. A switch valve unit, comprising:
    a valve house to define a valve cavity having an open bottom end port;
    an at least partially axially deformable diaphragm member which is mounted in the valve cavity to divide the valve cavity into an upper cavity portion and a lower cavity portion, and provided with a first hole and a second hole spaced from each other for providing fluid communication between the upper cavity portion and the lower cavity portion;
    a button axially movably mounted on the valve house; and
    a valve rod assembly connected to the button so as to follow the movement of the button, extending through the valve house and into the upper cavity portion, and having a first position in which the first hole is sealed and a second position in which the valve rod assembly is disengaged from the first hole,
    wherein the valve house at the top thereof includes a central protrusion, and a surrounding wall surrounding the central protrusion, and defined between the central protrusion and the surrounding wall is a receiving space for receiving the button, wherein the central protrusion and/or the surrounding wall comprise at least one vertical ridge and/or at least one vertical groove, and the button comprises at least one corresponding vertical ridge and/or vertical groove, and arranged between the button and the valve house is a third spring;
    wherein the valve house comprises:
        a first house body;
        a second house body releasably mounted on the first house body and defining the valve cavity together with the first house boy;
        a third house body releasably mounted on the second house body and supporting at least a portion of the valve rod assembly; and
        a fourth house body configured to cover over the second house body and the third house boy, connected to the first house body, and having a step in axial backstop cooperation with the third house body, wherein the central protrusion and the surrounding wall are defined by the fourth house body.

2. The switch valve unit of claim 1, further comprising a spring means arranged in the upper cavity portion between the diaphragm member and the valve house.

3. The switch valve unit of claim 2, wherein the spring means comprises a first spring, and a second spring sleeving over the first spring.

4. The switch valve unit of claim 3, wherein the second spring comprises a puncturing member configured to extend into the second hole and move in respect of the diaphragm member.

5. The switch valve unit of claim 1, further comprising a cover member mounted on the button.

6. The switch valve unit of claim 5, wherein provided between the cover member and the button are a snap-fit means formed by cooperation between an expansion portion and a snap jaw, and an anti-rotation means formed by cooperation between the at least one vertical ridge and the at least one vertical groove.

7. A switch valve unit of claim 1, comprising:
    a cover member mounted on the button, wherein provided between the cover member and the button are an anti-rotation means and a snap-fit means.

8. The switch valve unit of claim 7, wherein the snap-fit means comprises:
    an expansion portion formed on the cover member and
    a snap member formed on the button and provided with an axial-extending cantilever and a snap jaw at a free end of the cantilever.

9. The switch valve unit of claim 7, wherein the anti-rotation means comprises:
    formed on the cover member, first vertical ridges and first vertical grooves between the first vertical ridges; and
    formed on the button, second vertical ridges and second vertical grooves between the second vertical ridges, wherein the first vertical ridges are configured to be received in the second vertical grooves, and the second vertical ridges are configured to be received in the first vertical grooves.

10. The switch valve unit of claim 7, wherein the snap-fit means and the anti-rotation means are circumferentially spaced.

11. A fluid switch comprising:
    at least one pipe joint having an outer wall and an inner wall that defines a central cavity, wherein an annular cavity is defined between the outer wall and the inner wall; and
    the switch valve unit of claim 1, wherein the valve house is received in the pipe joint, the central cavity is in fluid communication with the first hole, and the annular cavity is in fluid communication with the second hole.

12. The fluid switch of claim 11, wherein the at least one pipe joint comprises an inflow passage in fluid communication with the annular cavity, and an outflow passage in fluid communication with the central cavity.

13. The fluid switch of claim 12, wherein the inflow passage extends in a radial direction of the inner wall.

14. The fluid switch of claim 12, wherein at least a portion of the inflow passage extends in an axial direction of the inner wall.

15. The fluid switch of claim 12, wherein the outflow passage coaxially extends with the inner wall.

16. The fluid switch of claim 12, wherein the outflow passage extends in an axial direction of the inner wall, and is offset from the inner wall axially.

17. The fluid switch of claim 12, wherein the outflow passage extends in a radial direction of the inner wall.

18. A kit of fluid switches comprising:
the switch valve unit of claim 1; and
a pipe joint for mounting with the switch valve unit, wherein the pipe joint is selected from at least one of the following groups:
- a. a first pipe joint having an outer wall and an inner wall that defines a central cavity in fluid communication with a first hole, wherein an annular cavity in fluid communication with a second hole is defined between the outer wall and the inner wall, and the outer wall is integral with an inflow passage extending in a radial direction of the inner wall and in fluid communication with the annular cavity, and an outflow passage coaxially extending with the inner wall and in fluid communication with the central cavity;
- b. a second pipe joint having an outer wall and an inner wall that defines a central cavity in fluid communication with a first hole, wherein an annular cavity in fluid communication with a second hole is defined between the outer wall and the inner wall, and the outer wall is integral with an inflow passage extending in a radial direction of the inner wall and in fluid communication with the annular cavity, and an outflow passage extending in the radial direction of the inner wall and in fluid communication with the central cavity;
- c. a third pipe joint having an outer wall and an inner wall that defines a central cavity in fluid communication with a first hole, wherein an annular cavity in fluid communication with a second hole is defined between the outer wall and the inner wall, and the outer wall is integral with an inflow passage at least partially extending in an axial direction of the inner wall and in fluid communication with the annular cavity, and an outflow passage extending in a radial direction of the inner wall and in fluid communication with the central cavity; and
- d. a fourth pipe joint having an outer wall and an inner wall that defines a central cavity in fluid communication with a first hole, wherein an annular cavity in fluid communication with a second hole is defined between the outer wall and the inner wall, and the outer wall is integral with an inflow passage extending in an axial direction of the inner wall and in fluid communication with the annular cavity, and an outflow passage axially offset from the inner wall and in fluid communication with the central cavity.

* * * * *